US007424333B2

(12) United States Patent
Williams et al.

(10) Patent No.: US 7,424,333 B2
(45) Date of Patent: Sep. 9, 2008

(54) AUDIO FIDELITY METER

(75) Inventors: John Williams, Montecho, CA (US); Scott Bahneman, Incline Village, NV (US); Adrian King, Stateline, NV (US)

(73) Assignee: MusicGiants, Inc., Incline Village, NV (US)

( * ) Notice: Subject to any disclaimer, the term of this patent is extended or adjusted under 35 U.S.C. 154(b) by 75 days.

(21) Appl. No.: 11/313,868

(22) Filed: Dec. 20, 2005

(65) Prior Publication Data

US 2006/0136080 A1 Jun. 22, 2006

Related U.S. Application Data

(60) Provisional application No. 60/638,850, filed on Dec. 22, 2004.

(51) Int. Cl.
*G06F 17/00* (2006.01)

(52) U.S. Cl. ............................ 700/94; 381/56; 381/58; 715/716

(58) Field of Classification Search .................. 381/56, 381/58; 715/716, 727; 704/E19.002
See application file for complete search history.

(56) References Cited

U.S. PATENT DOCUMENTS

| | | | | |
|---|---|---|---|---|
| 4,258,317 | A * | 3/1981 | Dubauskas | 324/114 |
| 5,442,737 | A * | 8/1995 | Smith | 345/639 |
| 5,977,468 | A | 11/1999 | Fujii | |
| 6,570,081 | B1 | 5/2003 | Suzuki et al. | |
| 6,696,631 | B2 | 2/2004 | Smith et al. | |
| 6,725,111 | B2 | 4/2004 | Naruki et al. | |
| 6,747,678 | B1 | 6/2004 | Katayama et al. | |
| 6,763,275 | B2 | 7/2004 | Naruki et al. | |
| 2002/0045960 | A1 * | 4/2002 | Phillips et al. | 700/94 |
| 2002/0112237 | A1 | 8/2002 | Kelts | |

(Continued)

FOREIGN PATENT DOCUMENTS

WO WO 03/006936 1/2003

OTHER PUBLICATIONS

Bit rate—Wikipedia, [online] [retrieved Nov. 12, 2007] <http://web.archive.org/web/20040621072247/http://en.wikipedia.org/wiki/Bit_rate> [archived Jun. 21, 2004].*

(Continued)

*Primary Examiner*—Sinh Tran
*Assistant Examiner*—Walter F Briney, III
(74) *Attorney, Agent, or Firm*—Cislo & Thomas, LLP

(57) ABSTRACT

An audio fidelity meter includes a scale which uses colors to visually represent the fidelity of an encoded digital audio file based at least on its extracted bit rate. The bit rate is one of several digital audio quality descriptors. Other descriptors include format, source, bit width, and sample rate. The extracted bit rate is fed into a lookup table for processing. One or more of the other descriptors can also be extracted and fed in combination with the extracted bit rate into the lookup table for processing. The lookup table stores information on various digital audio formats, sources and associated bit rates, bit widths and sample rates in the form of a database. The input bit width, sample rate, format, originating source and/or bit rate is/are compared against the database to generate a digital audio quality output. The output may be visually displayed via the scale, a fidelity meter needle and an associated numerical bit rate display.

65 Claims, 7 Drawing Sheets

U.S. PATENT DOCUMENTS

| | | | |
|---|---|---|---|
| 2003/0071839 | A1 | 4/2003 | Weng et al. |
| 2003/0086699 | A1 | 5/2003 | Benyamin et al. |
| 2003/0163211 | A1 | 8/2003 | Van Der Meulen |

OTHER PUBLICATIONS

MP3—Wikipedia, [online] [retrieved Nov. 12, 2007] <http://web.archive.org/web/20040116005406/http://en.wikipedia.org/wiki/MP3>[archived Jan. 16, 2004].*

Winamp v. 2.95 [online] [retrieved Nov. 12, 2007] <http://www.winampheaven.net/latest.php> [released Jun. 24, 2003] (three screenshots).*

Frequently Asked Questions, [online] [retrieved Nov. 12, 2007] <http://web.archive.org/web/20010803072258/http://www.angelfire.com/ny3/mrpotatoz/faq.html> [archived Aug. 3, 2001].*

* cited by examiner

18

Fidelity Meter Lookup Table

16-Bit width, 44.1kHz (Format through High quality)

two channels (stereo) (Format through High Definition (HD) Audio)

lossless (High quality through High Definition (HD) Surround)

Six Channels (High Definition (HD) Surround)

| Format | Low Quality | Medium quality | High quality | High Definition (HD) Audio | High Definition (HD) Surround |
|---|---|---|---|---|---|
| WMA from primary source | 0 to 128 kbps | 129 to 399 kbps | 400 kbps and above | 400 kbps and above, greater than 16-bit width and greater than 44.1 kHz sample rate | Same as HD audio, with 6 channels. |
| WMA from other source | 0 to 191 kbps | 192 kbps and above | — | — | — |
| CD-DA | — | — | Any Audio CD | — | — |
| MP3 from primary source | 0 to 128 kbps | 129 kbps and above | — | — | — |
| MP3 from other source | 0 to 191 kbps | 192 kbps and above | — | — | — |
| AAC from primary source | 0 to 128 kbps | 129 to 399 kbps | 400 kbps and above | 400 kbps and above, greater than 16-bit width and greater than 44.1 kHz sample rate | Same as HD audio, with 6 channels. |

Ⓐ Ⓑ Ⓒ Ⓓ Ⓔ Ⓕ Ⓖ

FIG. 7A

Ⓐ Ⓑ Ⓒ Ⓓ Ⓔ Ⓕ Ⓖ

| | | | | | |
|---|---|---|---|---|---|
| AAC from other source | 0 to 191 kbps | 192 kbps and above | — | — | — |
| FLAC from primary source | 0 to 128 kbps | 129 to 399 kbps | 400 kbps and above | 400 kbps and above, greater than 16-bit width and greater than 44.1 kHz sample rate | Same as HD audio, with 6 channels. |
| FLAC from other source | 0 to 191 kbps | 192 kbps and above | — | — | — |
| Real from primary source | 0 to 128 kbps | 129 to 399 kbps | 400 kbps and above | 400 kbps and above, greater than 16-bit width and greater than 44.1 kHz sample rate | Same as HD audio, with 6 channels. |
| Real from other source | 0 to 191 kbps | 192 kbps and above | — | — | — |
| WAV from primary source | 0 to 128 kbps | 129 to 399 kbps | 400 kbps and above | — | — |
| WAV from other source | 0 to 191 kbps | 192 kbps and above | — | — | — |

FIG. 7B

FIG. 7
7A
7B

AUDIO FIDELITY METER

CROSS REFERENCE TO RELATED APPLICATIONS

This application claims the benefit of U.S. Provisional Patent Application No. 60/638,850 filed on Dec. 22, 2004, which is incorporated herein in its entirety by reference.

BACKGROUND

The bit rate of a digital file has to do with how many bits the file uses up in a given interval of time. Typically, the higher the bit rate at which music is encoded, the better the playback sounds. For example, a rate of 128 kbps (kilobits per second) is popular in online music downloading since it offers a good compromise between sound quality and download time. Bit rates lower than 128 kbps are generally not suitable for CD (Compact Disc) or hard drive-based devices. Very low bit rates (below 64 kbps) compress voice fairly well and are well suited for online voice chat or streaming radio.

Two other descriptors of digital file sound quality are bit width and sample rate. Most digital music is encoded with a bit width of 16 bits, and a sample rate of 44.1 kHz (CD quality), or lower. Music encoded with a higher bit width and sample rate is considered High Resolution (HR) or High Definition (HD) audio (hereinafter referred to as 'HD audio'). Since music is typically recorded in a studio at higher bit widths and sample rates than CD quality, HD audio files more closely reproduce the true sound of such music files. Music files recorded in two channels, left and right, are stereo music files. Music files that are recorded in more than two channels are called multi-channel recordings, and a common multi-channel format is the 5.1 HD Surround, which includes six (6) music channels for left, right, center, rear left, rear right, and subwoofer.

Constant Bit Rate (CBR) audio files use up the same amount of data from one moment to the next. A Variable Bit Rate (VBR) audio file uses a lower bit rate in areas of the song that are simpler to compress accurately, and higher bit rates in parts that require more bits to describe accurately. A VBR sound file generally sounds better than a CBR file of the same size. VBR files are somewhat difficult to stream over the Internet since the amount of incoming data constantly changes from one moment to the next.

SUMMARY

Exemplary embodiments disclosed herein are generally directed to an audio fidelity meter.

In accordance with one aspect of the invention, the audio fidelity meter comprises a fidelity meter scale adapted to visually represent the sound quality of an encoded digital audio file based at least on its extracted bit rate, a fidelity meter needle configured to position itself over the fidelity meter scale in accordance with the extracted bit rate, and means for numerically displaying the extracted bit rate of the digital audio file during playback.

In accordance with another aspect of the invention, the audio fidelity meter comprises at least one lookup table adapted to store information on a plurality of digital audio quality descriptors including format, source, bit rate, bit width, and sample rate in the form of a database. The lookup table may be configured to receive input on at least the bit rate extracted from an encoded digital audio file. The input bit rate is then compared against the database to generate a corresponding digital audio quality output. The lookup table may also be configured to receive input on at least one of the remaining digital audio quality descriptors extracted from the encoded digital audio file. The remaining digital audio quality descriptors include format, source, bit width, and sample rate. In such case, the input bit rate and at least one of the remaining digital audio quality descriptors are compared against the database to generate a corresponding digital audio quality output.

The audio fidelity meter also comprises a fidelity meter scale adapted to visually display the corresponding digital audio quality output, a fidelity meter needle configured to position itself over the fidelity meter scale in accordance with the extracted bit rate, and means for numerically displaying the extracted bit rate of the digital audio file during playback.

Exemplary embodiments disclosed herein are also generally directed to an audio fidelity system.

In accordance with one aspect of the invention, the audio fidelity system comprises a central processing unit (CPU), a memory module operatively coupled to the CPU, and an operating system (OS) operatively coupled between the CPU and the memory module. The audio fidelity system also comprises an audio fidelity meter adapted to run on top of the OS. The audio fidelity meter is configured to receive digital audio file input and communicate with the OS to render visually the sound quality of the digital audio file.

Exemplary embodiments disclosed herein are further directed to a method for visually displaying audio fidelity.

In accordance with one aspect of the invention, the method comprises the steps of:

(a) reading the codec from a digital audio file;

(b) reading the bit rate from the digital audio file;

(c) using a lookup table to determine the fidelity level of the digital audio file;

(d) playing the digital audio file;

(e) moving a fidelity meter needle from a default position to a position corresponding to the determined audio fidelity level; and (f) updating the colors on an associated fidelity meter scale to reflect the determined audio fidelity level.

In accordance with another aspect of the invention, the method comprises the steps of:

(a) reading the codec from a digital audio file;

(b) reading the bit rate from the digital audio file;

(c) using a lookup table to determine the fidelity level of the digital audio file;

(d) playing the digital audio file;

(e) moving a fidelity meter needle from a default position to a position corresponding to the determined audio fidelity level;

(f) updating the colors on an associated fidelity meter scale to reflect the determined audio fidelity level; and (g) oscillating the fidelity meter needle based on waveform data stored in the digital audio file.

These and other aspects of the invention will become apparent from a review of the accompanying drawings and the following detailed description of the invention.

BRIEF DESCRIPTION OF THE DRAWINGS

The invention is generally shown by way of reference to the accompanying drawings in which:

FIG. 7 (shown in parts 7A-7B) schematically depicts an audio fidelity meter lookup table in accordance with an exemplary embodiment of the present invention;

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, it is to be understood that the same or equivalent functions and sequences may be accomplished by different embodiments that are also intended to be encompassed within the spirit and scope of the invention.

Some embodiments of the invention will be described in detail with reference to the related drawings of FIGS. 1-10. Additional embodiments, features and/or advantages of the invention will become apparent from the ensuing description or may be learned by practicing the invention. In the figures, the drawings are not to scale with like numerals referring to like features throughout both the drawings and the description.

Figure 3:
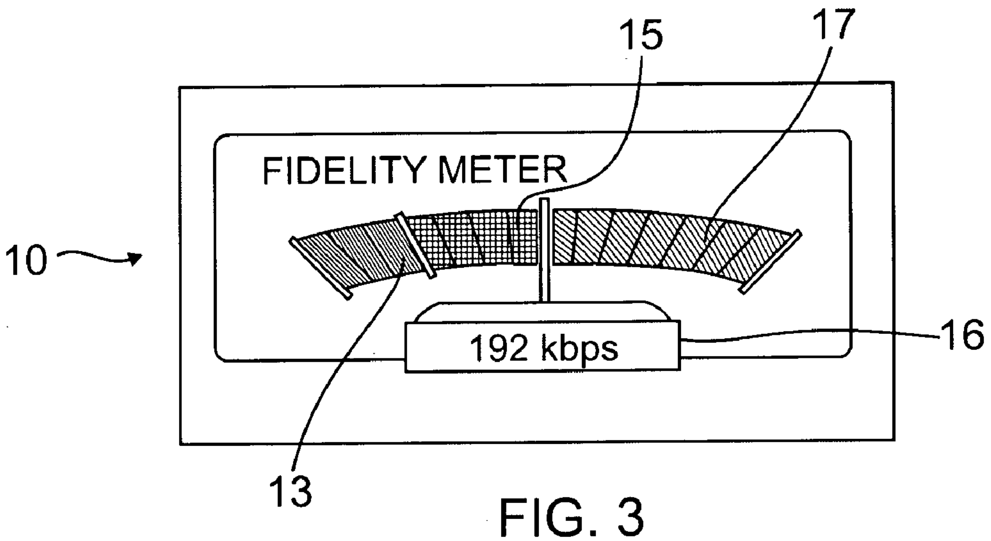
FIG. 3 is a schematic representation of an audio fidelity meter in accordance with yet another exemplary embodiment of the present invention.

The present invention is generally directed to an audio fidelity meter 10 (FIGS. 1-10) configured to represent visually the sound of music as a digital music file is being played. Audio fidelity meter 10 is also configured to provide visual information on the sound quality of the digital music file being played. Visual representation may be in the form of a fidelity meter scale 12 (FIG. 1), a fidelity meter needle 14 (FIG. 2), and a fidelity meter bit rate display 16 (FIG. 3). Audio fidelity meter 10 may be implemented as a "client" in software form. Generally, a "client" is an application that runs on a personal computer or workstation and relies on a server to perform some operations. Audio fidelity meter 10 may also be implemented in hardware form. Other software and/or hardware implementations may be utilized as long there is no departure from the intended scope and spirit of the present invention.

Figure 1:
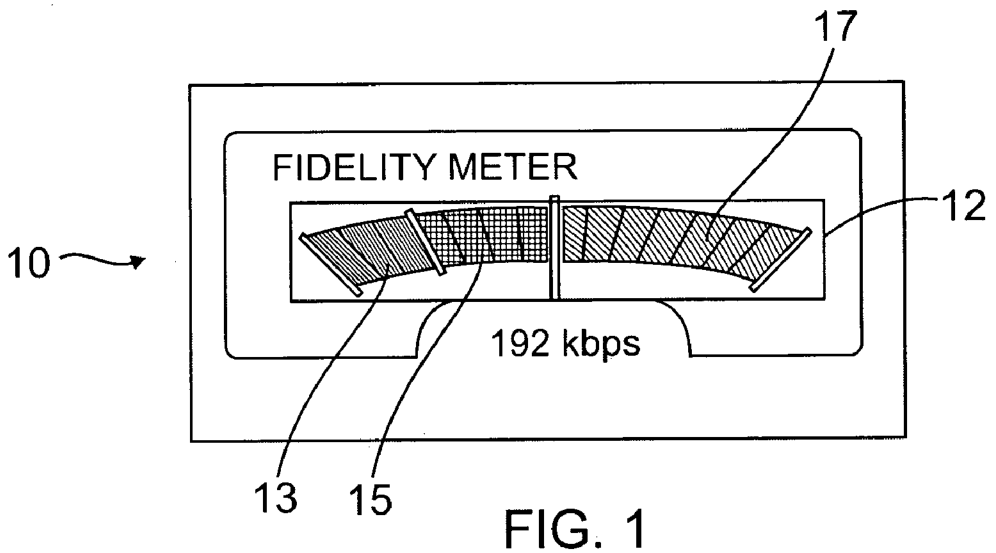
FIG. 1 is a schematic representation of an audio fidelity meter in accordance with an exemplary embodiment of the present invention.
Figure 2:
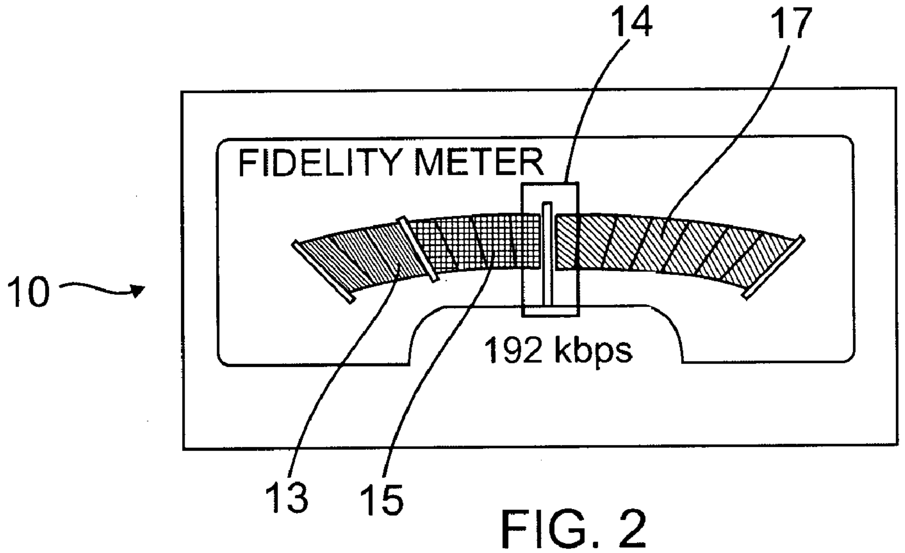
FIG. 2 is a schematic representation of an audio fidelity meter in accordance with another exemplary embodiment of the present invention.

As generally illustrated in FIG. 1, fidelity meter scale 12 may be configured to use different colors to visually represent the sound quality of a digital audio file based on its bit width, sample rate, format, originating source and/or bit rate. Bit rate is generally defined as the ratio of the number of bits being transferred between devices in a specified amount of time, typically one second. In one embodiment, fidelity meter scale 12 uses different colors to visually represent the sound quality of an encoded digital audio file based at least on its extracted bit rate. In other embodiment(s), fidelity meter scale 12 uses different colors to visually represent the sound quality of an encoded digital audio file based on its extracted bit rate and one or more of the following: sample rate, format, originating source, and bit width.

Fidelity meter scale 12 may use various colors to visually separate bit rate into levels of sound quality, such as low, medium, high, HD audio, and HD surround. For example, low quality bit rates may be represented by the color red, medium quality bit rates may be represented by the color yellow, and high quality bit rates may be represented by the color green. HD audio and HD surround may be represented, for example, by the color purple. Other suitable colors, color combination(s), levels of sound quality, and/or visual representations may be utilized, as desired.

As schematically depicted in FIG. 7, low quality may be defined as "0 to 128 kbps" or "0 to 191 kbps" (16-bit width, 44.1 kHz sample rate, two channels), depending on digital audio file source. Similarly, medium quality may be defined as "129 to 399 kbps," "192 kbps and above" or "129 kbps and above" (16-bit width, 44.1 kHz sample rate, two channels), depending on digital audio file source. High quality may be defined as "400 kbps and above" or "any audio CD" with 16-bit width, 44.1 kHz sample rate, and two (2) channels. HD audio may be defined as "400 kbps and above" with two (2) channels, bit width greater than 16 bits, and sample rate greater than 44.1 kHz. Also, 5.1 HD surround may be defined as "400 kbps and above" with six (6) channels, bit width greater than 16 bits, and sample rate greater than 44.1 kHz.

Moreover, high quality, HD audio and HD surround are grouped under the industry-standard category "lossless," as shown in FIG. 7. In one embodiment, the "lossless" category covers bit rates over 400 kbps. Thus, lossless bit rate band 17 in FIGS. 1-5 would correspond to high quality (green color), while lossless bit rate band 19 in FIGS. 4-5 would correspond to HD audio and HD surround (purple color), respectively, as defined hereinabove. Bit rate bands 13, 15 would correspond to low and medium quality, respectively, as defined hereinabove. Various other bit rate band combinations and colors may be utilized, as needed.

Fidelity meter needle 14 is configured to position itself over fidelity meter scale 12 based on the bit rate of the currently playing digital audio file. When a digital audio file begins playback, fidelity meter needle 14 moves across fidelity meter scale 12 to a position corresponding to the bit rate of the currently playing digital audio file. As fidelity meter needle 14 moves across fidelity meter scale 12, fidelity meter scale 12 is properly colored to represent the sound quality of the currently playing digital audio file.

When playback ends, fidelity meter needle 14 moves back across fidelity meter scale 12 to return to a pre-determined "base" or "start" position. As fidelity meter needle 14 moves back across fidelity meter scale 12, fidelity meter scale 12 returns to a pre-determined default color. In one embodiment, when fidelity meter needle 14 has moved to the proper position (on fidelity meter scale 12) for the currently playing digital audio file, it begins to oscillate in synchronization with the sound of the digital audio file. This is achieved by reading the audio waveform data of the digital music file at timed intervals during playback. As the waveform data of the digital music file fluctuates, so does fidelity meter needle 14. The waveform data is stored in the digital audio file. In another embodiment, when fidelity meter needle 14 has moved to the proper position (on fidelity meter scale 12) for the currently playing digital audio file, it does not oscillate in synchronization with the sound of the digital audio file.

Fidelity meter bit rate display 16 provides numerical representation of the bit rate of a currently playing digital audio file. When a digital audio file begins playback, fidelity meter bit rate display 16 fills in with the current bit rate, typically in kilobits per second (kbps). For VBR (Variable Bit Rate) encoded digital audio files, fidelity meter bit rate display 16 may be dynamically updated with the current bit rate as the digital audio file is being played, or it may show a constant value representing the average, mean, or median bit rate of the digital audio file. Since the bit rate of a VBR file varies at different points in time while playing the digital audio file, a mean, for example, may be calculated by some arbitrary sampling rate of the file. In one embodiment, a one-second interval for taking samples may be utilized. The following is an example of computation of average, mean and median bit rate for a ten-second VBR-encoded digital audio file over a one-second interval:

| | One-Second Interval | | | | | | | | | |
|---|---|---|---|---|---|---|---|---|---|---|
| | 1 | 2 | 3 | 4 | 5 | 6 | 7 | 8 | 9 | 10 |
| Bit Rate (kbps) | 498 | 521 | 534 | 566 | 589 | 601 | 615 | 576 | 543 | 545 |

Based on the exemplary data in the table hereinabove, the average bit rate (in kbps) would be 558.8, the mean bit rate would be 557.68, and the median bit rate would be 555.5.

Figure 4:
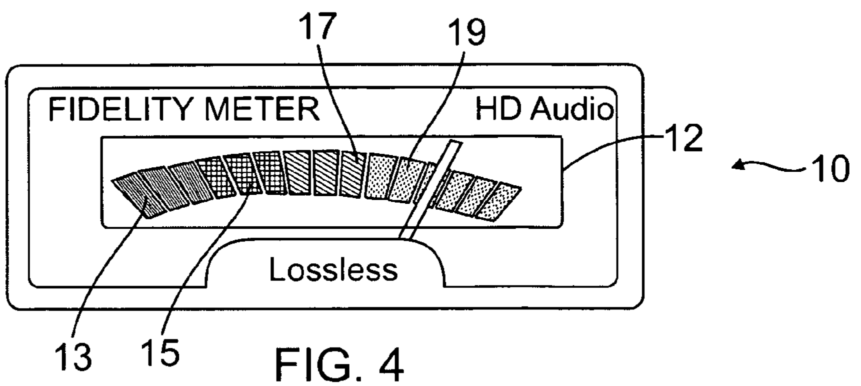
FIG. 4 is a schematic representation of an audio fidelity meter in accordance with still another exemplary embodiment of the present invention.
Figure 5:
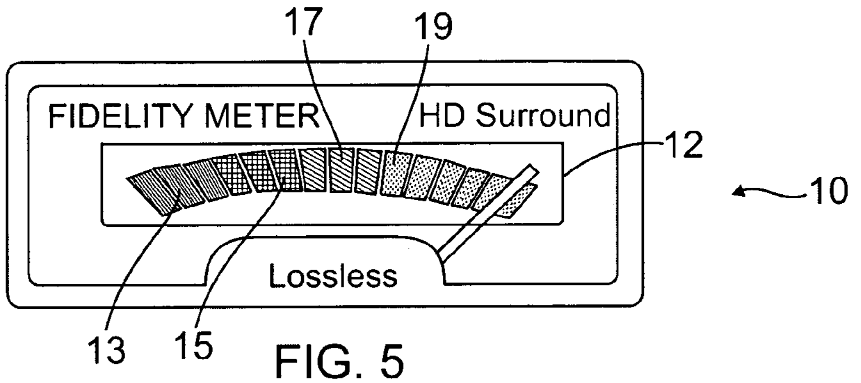
FIG. 5 is a schematic representation of an audio fidelity meter in accordance with a further exemplary embodiment of the present invention.

For CBR (Constant Bit Rate) encoded digital audio files, fidelity meter bit rate display 16 shows one bit rate during the entire playback of the digital audio file, e.g. 192 kbps, as shown in FIG. 3. If the bit rate is in the high quality, HD audio, or HD surround range, display 16 would simply show "lossless," as shown in FIGS. 4-5.

There exists a variety of formats and codecs for encoding digital audio. The term "codec" generally refers to a coder/decoder device or program that compresses or decompresses a data stream. An audio codec is a computer program that compresses/decompresses digital audio data according to a given audio file or streaming audio format. Most codecs are implemented as libraries which interface to one or more multimedia players, such as Winamp® or Windows Media Player®. Some examples of popular formats for digital audio include MP3 (MPEG audio layer 3), where MPEG stands for "Moving Picture Experts Group," WMA (Window Media audio), AAC (Advanced Audio Coding), FLAC (Free Lossless Audio Codec), RealAudio®, WAV, and CD-DA (standard audio CD).

No matter what format a digital audio file is encoded in, it is possible to extract the bit rate used for that encoding and rate the playback quality of the digital audio file based on the extracted bit rate. Playback quality may also be rated based on extracted digital audio format and originating source, e.g. whether the digital audio file came from a primary source or from some other source. Playback quality may further be rated based on extracted bit width and sample rate of the digital audio file. The bit rate, format, originating source, sample rate and bit width may be extracted using standard industry algorithms.

Figure 6:
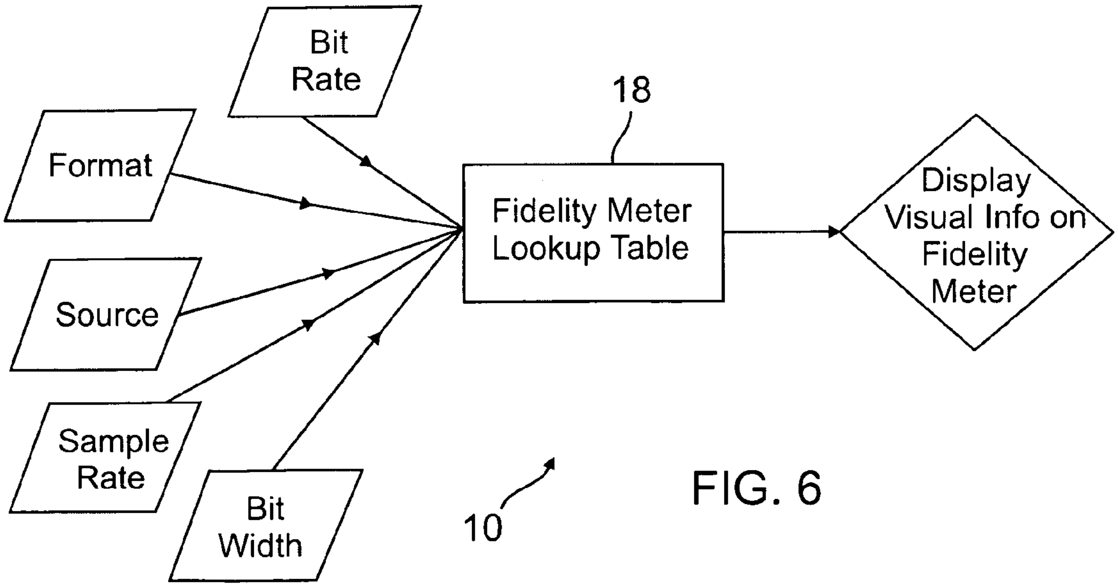
FIG. 6 is an audio fidelity meter operational block diagram in accordance with an exemplary embodiment of the present invention.

FIG. 6 schematically shows bit rate, format, source, bit width and sample rate data (extracted from an encoded digital audio file) being fed into a lookup table 18 of fidelity meter 10 (FIG. 6) for processing in accordance with the general principles of the present invention. Fidelity meter lookup table 18 (FIG. 6) stores information on various digital audio formats, sources and associated bit rates, bit widths and sample rates in the form of a database, as schematically shown in FIG. 7. The input digital audio bit rate, format, source, bit width and sample rate data is compared against the database of fidelity meter lookup table 18 with the corresponding digital audio quality output being visually displayed, as generally shown in reference to FIGS. 1-5. For example, if the currently playing digital audio file is in MP3 format from a primary source and at a bit rate of 128 kbps or less, the output color for the displayed bit rate may be "red," i.e. low quality bit rate. The bit rate, format, source, bit width and sample rate serve generally as digital audio quality descriptors.

In one embodiment, the extracted bit rate only may be compared against the database of fidelity meter lookup table 18 to generate a visual display of digital audio quality output in accordance with the present invention. In other embodiment(s) of the present invention, the extracted bit rate in combination with one or more of the other digital audio quality descriptors (i.e. format, source data, bit width, sample rate) may be compared against the database of fidelity meter lookup table 18 to generate a visual display of digital audio quality output in accordance with the present invention.

Figure 8:
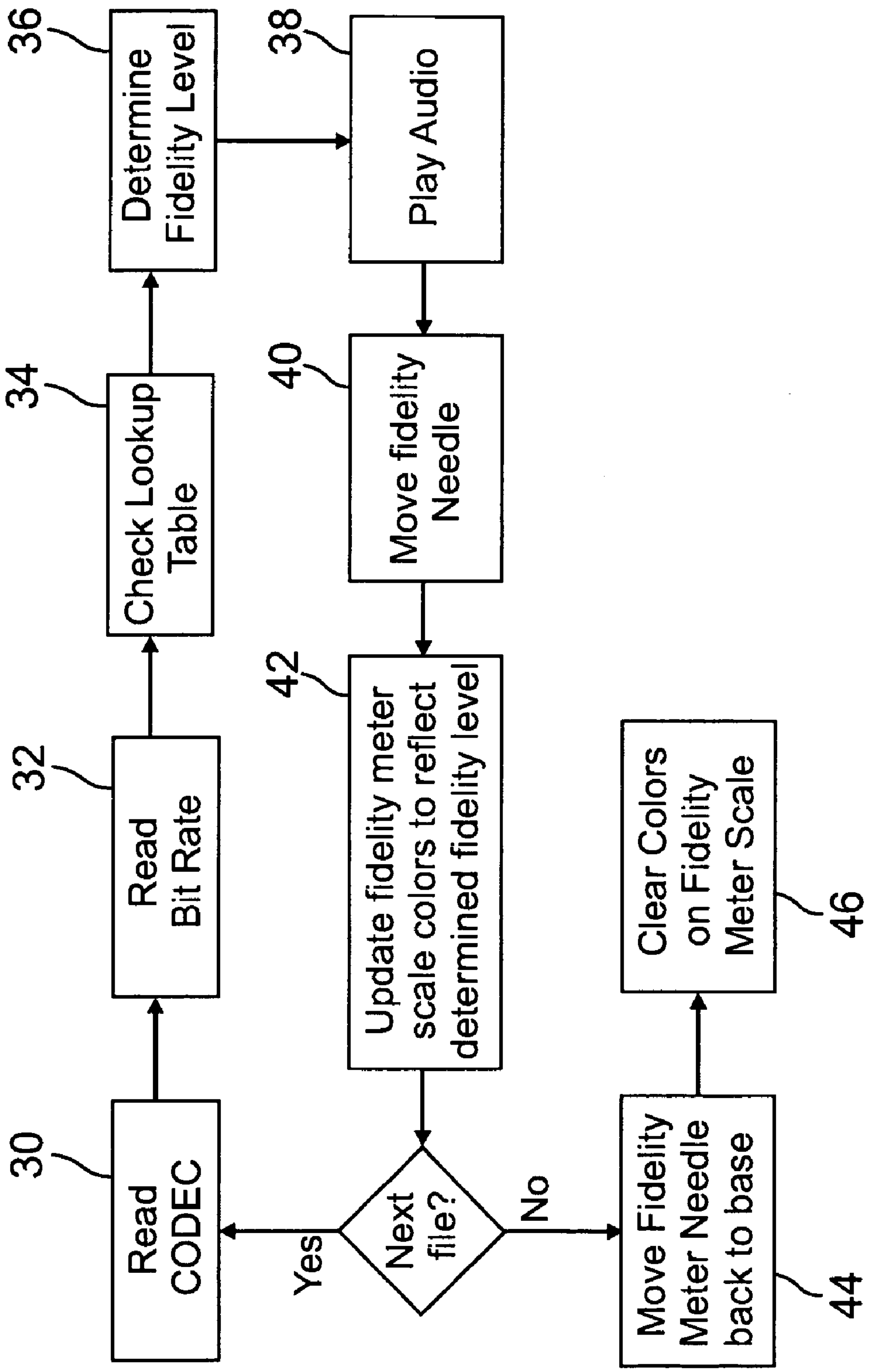
FIG. 8 is an audio fidelity meter operational flow chart in accordance with an exemplary embodiment of the present invention.

In accordance with an exemplary embodiment of the present invention, as schematically shown in FIG. 8, audio fidelity meter 10 is configured to perform the following operational steps:

(a) read the codec from an input digital audio file (step 30);

(b) read the bit rate from the input digital audio file (step 32);

(c) check lookup table 18 to determine the respective fidelity (digital audio quality) level (steps 34, 36, respectively);

(d) play the digital audio file (step 38);

(e) move fidelity meter needle 14 (FIG. 2) from a default (base) position to a position corresponding to the determined fidelity level (step 40);

(f) update the colors on fidelity meter scale 12 (FIGS. 1, 4-5) to reflect the determined fidelity level (step 42);

(g) repeat steps 30-42 if another digital audio file needs processing;

(h) in the absence of another digital audio file, move fidelity meter needle 14 (FIG. 2) back to its default (base) position (step 44); and (i) clear the colors on fidelity meter scale 12 (FIGS. 1, 4-5), i.e. set fidelity meter scale 12 to a pre-set default color (step 46).

In other exemplary embodiment(s), step 32 (described hereinabove) may be modified to include in addition reading any one of the following digital audio file descriptors: bit width, sample rate, format, and originating source.

Figure 9:
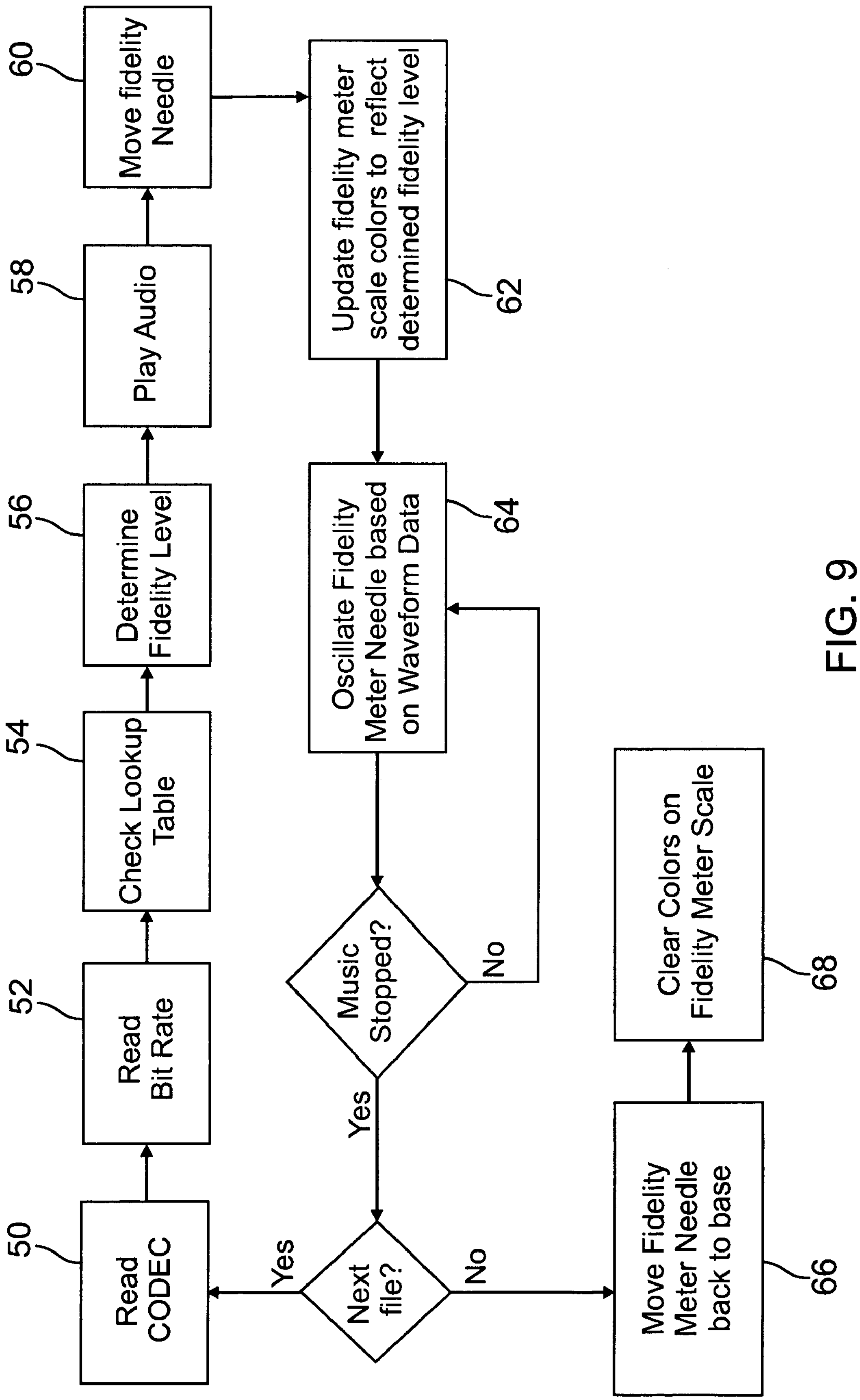
FIG. 9 is an audio fidelity meter operational flow chart in accordance with an alternative exemplary embodiment of the present invention.

In accordance with an alternative exemplary embodiment of the present invention, as schematically shown in FIG. 9, fidelity meter 10 is configured to perform the following operational steps:

(a) read the codec from an input digital audio file (step 50);

(b) read the bit rate from the input digital audio file (step 52);

(c) check lookup table 18 to determine the respective fidelity (digital audio quality) level (steps 54, 56, respectively);

(d) play the digital audio file (step 58);

(e) move fidelity meter needle 14 (FIG. 2) from a default (base) position to a position corresponding to the determined fidelity level (step 60);

(f) update the colors on fidelity meter scale 12 (FIGS. 1, 4-5) to reflect the determined fidelity level (step 62);

(g) oscillate fidelity meter needle 14 based on waveform data stored in the digital audio file (step 64);

(h) if digital audio playback has not stopped, repeat step 64;

(i) if digital audio playback has stopped, repeat steps 50-64 if another digital audio file needs processing, whereby the last step (64) is repeated if digital audio playback has stopped;

(j) in the absence of another digital audio file, move fidelity meter needle 14 (FIG. 2) back to its default (base) position (step 66); and (k) clear the colors on fidelity meter scale 12 (FIGS. 1, 4-5), i.e. set fidelity meter scale 12 to a pre-set default color (step 68).

In other exemplary embodiment(s), step 52 (described hereinabove) may be modified to include in addition reading any one of the following digital audio file descriptors: bit width, sample rate, format, and originating source.

Figure 10:
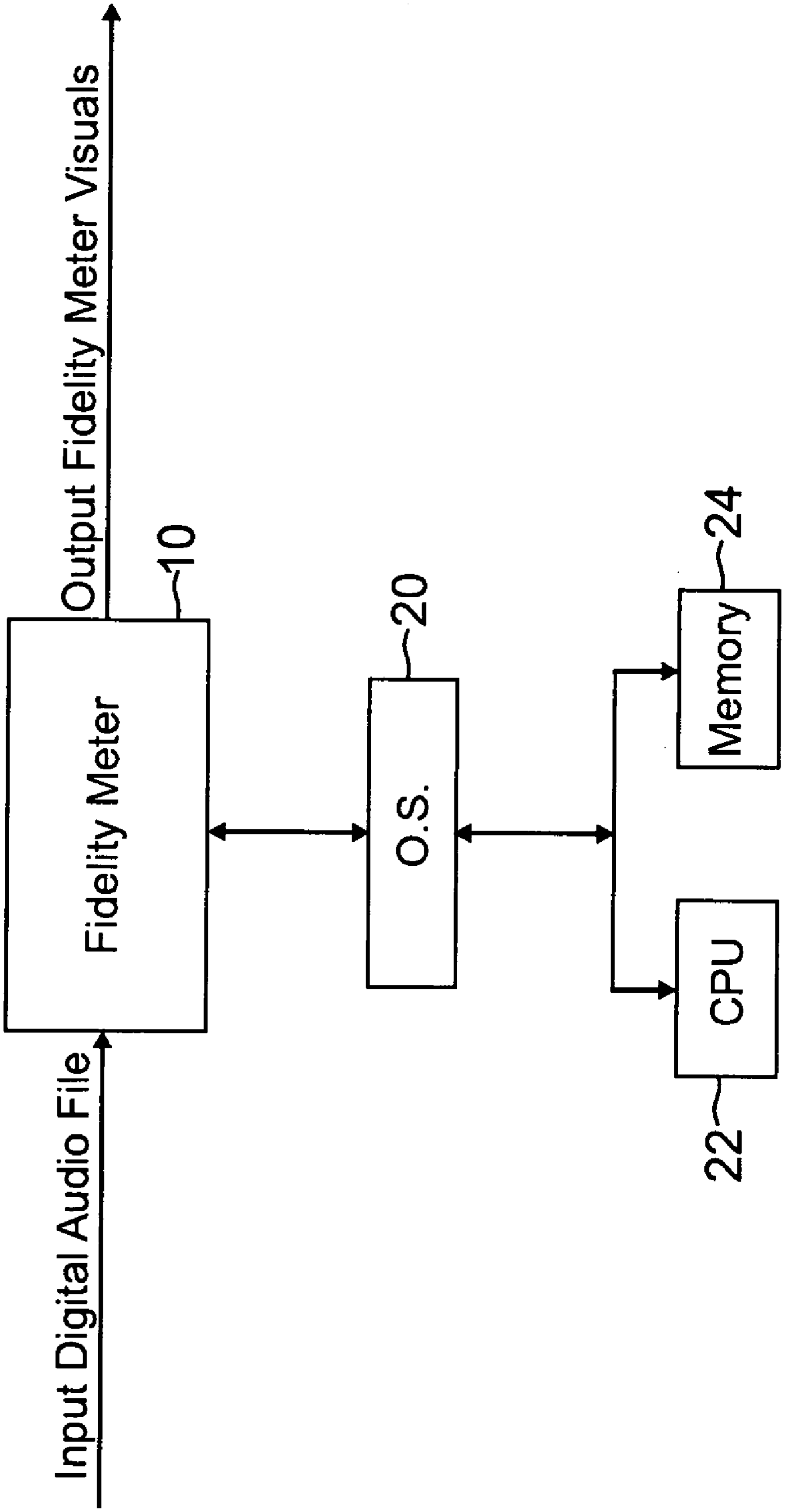
FIG. 10 is an audio fidelity meter operational block diagram in accordance with yet another exemplary embodiment of the present invention.

FIG. 10 is an audio fidelity meter operational block diagram in accordance with yet another exemplary embodiment of the present invention. Particularly, fidelity meter 10 receives digital audio file input and communicates with OS (Operating System) 20 to render (output) respective visual fidelity level representations via fidelity meter scale 12 (FIGS. 1, 4-5), fidelity meter needle 14 (FIG. 2), and fidelity meter bit rate display 16 (FIG. 3). OS 20 utilizes CPU (Central Processing Unit) 22 and memory module 24 to run. When implemented in software form, fidelity meter 10 runs as a client on top of OS 20 (FIG. 10). A person skilled in the art would readily appreciate that CPU 22, memory module 24, OS 20, and fidelity meter 10 may be operatively implemented on a personal computer (PC), workstation, laptop, tablet PC, mobile PC and/or the like.

A person skilled in the art would also appreciate that the exemplary embodiments described hereinabove are merely illustrative of the general principles of the present invention. Other modifications and/or variations may be employed that reside within the scope of the invention. For example, the audio fidelity meter of the present invention may be readily adapted for use with other HD multi-channel audio formats, not just 5.1 HD surround, as needed. Moreover, more than one lookup table may be utilized in accordance with the general principles of the present invention, if needed. Thus, by way of example, but not of limitation, alternative configurations may be utilized in accordance with the teachings herein. Accordingly, the drawings and description are illustrative and not meant to be a limitation thereof.

All terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed:

1. An audio fidelity meter, comprising:

a fidelity meter scale adapted to visually represent the sound quality of an encoded digital audio file based at least on its extracted bit rate;

a fidelity meter indicator configured to position itself over said fidelity meter scale in accordance with the extracted bit rate, said fidelity meter indicator is adapted to oscillate in synchronization with the sound of the digital audio file; and means for numerically displaying the extracted bit rate of the digital audio file during playback.

2. The audio fidelity meter of claim 1, wherein said numerical displaying means includes a fidelity meter bit rate display operatively associated with said fidelity meter scale and indicator.

3. The audio fidelity meter of claim 2, wherein said fidelity meter bit rate display is dynamically updated during playback of a VBR (Variable Bit Rate) encoded digital audio file.

4. The audio fidelity meter of claim 2, wherein said fidelity meter bit rate display shows one bit rate during the entire playback of a CBR (Constant Bit Rate) encoded digital audio file.

5. The audio fidelity meter of claim 2, wherein said fidelity meter bit rate display shows "lossless" if the bit rate of the digital audio file is in the high quality, HD audio or HD surround range.

6. The audio fidelity meter of claim 2, wherein said fidelity meter bit rate display shows a constant value representing the average bit rate of a VBR (Variable Bit Rate) encoded digital audio file.

7. The audio fidelity meter of claim 2, wherein said fidelity meter bit rate display shows a constant value representing the mean bit rate of a VBR (Variable Bit Rate) encoded digital audio file.

8. The audio fidelity meter of claim 2, wherein said fidelity meter bit rate display shows a constant value representing the median bit rate of a VBR (Variable Bit Rate) encoded digital audio file.

9. The audio fidelity meter of claim 1, wherein said fidelity meter scale uses different colors to visually separate the extracted bit rate into levels of sound quality.

10. The audio fidelity meter of claim 9, wherein said levels of sound quality include low, medium, high, HD (High Definition) audio, and HD surround.

11. The audio fidelity meter of claim 10, wherein said high, HD audio, and HD surround levels of sound quality are grouped under a "lossless" category.

12. The audio fidelity meter of claim 11, wherein said "lossless" category includes bit rates over 400 kbps (kilobits per second).

13. The audio fidelity meter of claim 10, wherein each of said low, medium, high, and HD audio levels of sound quality are reproduced in two-channel stereo.

14. The audio fidelity meter of claim 10, wherein a 5.1 HD surround level of sound quality is reproduced in six channels, said six channels being left, right, center, rear left, rear right, and subwoofer.

15. The audio fidelity meter of claim 10, wherein each of said low, medium, and high levels of sound quality are characterized by 16-bit width and 44.1 kHz sample rate.

16. The audio fidelity meter of claim 10, wherein said low level of sound quality is defined by bit rates in a first range of 0 to 128 kbps.

17. The audio fidelity meter of claim 10, wherein said low level of sound quality is defined by bit rates in a second range of 0 to 191 kbps.

18. The audio fidelity meter of claim 10, wherein said medium level of sound quality is defined by bit rates in a first range of 129 to 399 kbps.

19. The audio fidelity meter of claim 10, wherein said medium level of sound quality is defined by bit rates in a second range of 192 kbps and above.

20. The audio fidelity meter of claim 10, wherein said medium level of sound quality is defined by bit rates in a third range of 129 kbps and above.

21. The audio fidelity meter of claim 10, wherein said high level of sound quality is defined by bit rates in a range of 400 kbps and above, 16-bit width, and 44.1 kHz sample rate.

22. The audio fidelity meter of claim 10, wherein said HD audio level of sound quality is defined by bit rates in a range of 400 kbps and above, bit width greater than 16 bits, sample rate greater than 44.1 kHz, and two-channel stereo.

23. The audio fidelity meter of claim 10, wherein a 5.1 HD surround level of sound quality is defined by bit rates in a range of 400 kbps and above, bit width greater than 16 bits, sample rate greater than 44.1 kHz, and six audio channels.

24. The audio fidelity meter of claim 10, wherein said low, medium, and high levels of sound quality are visually represented by red, yellow, and green colors, respectively.

25. The audio fidelity meter of claim 10, wherein said HD audio and HD surround levels of sound quality are visually represented by purple color.

26. The audio fidelity meter of claim 10, wherein said HD surround level of sound quality is reproduced in a plurality of channels.

27. The audio fidelity meter of claim 9, wherein said levels of sound quality include low, medium, high, HR (High Resolution) audio, and HD surround.

28. The audio fidelity meter of claim 1, wherein the bit rate is one of a plurality of digital audio quality descriptors, said plurality of digital audio quality descriptors further including format, source, bit width, and sample rate.

29. The audio fidelity meter of claim 28, wherein said fidelity meter scale is adapted to visually represent the sound quality of an encoded digital audio file based on its extracted bit rate and at least one of the remaining digital audio quality descriptors, wherein the remaining digital audio quality descriptors include format, source, bit width, and sample rate.

30. The audio fidelity meter of claim 1, wherein said fidelity meter indicator is adapted to return to a pre-determined base position when digital audio file playback ends.

31. The audio fidelity meter of claim 1, wherein said synchronized indicator oscillation is achieved by reading the waveform data of the digital audio file at timed intervals during playback.

32. A method for visually displaying audio fidelity, said method comprising the steps of:

(a) reading the codec from a digital audio file;

(b) reading the bit rate from the digital audio file;

(c) using a lookup table to determine the fidelity level of the digital audio file;

(d) playing the digital audio file;

(e) moving a fidelity meter indicator from a default position to a position corresponding to the determined audio fidelity level;

(f) updating the colors on an associated fidelity meter scale to reflect the determined audio fidelity level; and (g) oscillating said fidelity meter indicator based on waveform data stored in the digital audio file.

33. The method of claim 32, further comprising repeating steps (a)-(g) if another digital audio file needs processing.

34. The method of claim 32, further comprising moving said fidelity meter indicator back to said default position in the absence of another digital audio file, and clearing the colors on said fidelity meter scale.

35. The method of claim 32, further comprising repeating step (g) if digital audio playback has not stopped.

36. An audio fidelity meter, comprising:

a fidelity meter scale adapted to visually represent the sound quality of an encoded digital audio file based at least on its extracted bit rate;

a fidelity meter indicator configured to position itself over said fidelity meter scale in accordance with the extracted bit rate; and means for numerically displaying the extracted bit rate of the digital audio file during playback, said numerical displaying means including a fidelity meter bit rate display operatively associated with said fidelity meter scale and indicator, said fidelity meter bit rate display shows "lossless" if the bit rate of to the digital audio file is in the high quality, HD audio or HD surround range.

37. The audio fidelity meter of claim 36, wherein said fidelity meter scale uses different colors to visually separate the extracted bit rate into levels of sound quality.

38. The audio fidelity meter of claim 37, wherein said levels of sound quality include low, medium, high, HD (High Definition) audio, and HD surround.

39. The audio fidelity meter of claim 38, wherein said high, HD audio, and HD surround levels of sound quality are grouped under a "lossless" category.

40. The audio fidelity meter of claim 39, wherein said "lossless" category includes bit rates over 444 kbps (kilobits per second).

41. The audio fidelity meter of claim 38, wherein each of said low, medium, high, and HD audio levels of sound quality are reproduced in two-channel stereo.

42. The audio fidelity meter of claim 38, wherein a 5.1 HD surround level of sound quality is reproduced in six channels, said six channels being left, right, center, rear left, rear right, and subwoofer.

43. The audio fidelity meter of claim 38, wherein each of said low, medium, and high levels of sound quality are characterized by 24-bit width and 88.20 kHz sample rate.

44. The audio fidelity meter of claim 38, wherein said low level of sound quality is defined by bit rates in a first range of 24 kbps to 128 kbps.

45. The audio fidelity meter of claim 38, wherein said low level of sound quality is defined by bit rates in a second range of 24 kbps to 256 kbps.

46. The audio fidelity meter of claim 38, wherein said medium level of sound quality is defined by bit rates in a first range of 257 kbps to 455 kbps.

47. The audio fidelity meter of claim 38, wherein said medium level of sound quality is defined by bit rates in a second range of 257 kbps and above.

48. The audio fidelity meter of claim 38, wherein said medium level of sound quality is defined by bit rates in a third range of 192 kbps and above.

49. The audio fidelity meter of claim 38, wherein said high level of sound quality is defined by bit rates in a range of 456 kbps and above, 16-bit width, and 44.10 kHz sample rate.

50. The audio fidelity meter of claim 38, wherein said HD audio level of sound quality is defined by bit rates in a range of 456 kbps and above, bit width greater than 24 bits, sample rate greater than 88.20 kHz, and two-channel stereo.

51. The audio fidelity meter of claim 38, wherein a 5.1 HD surround level of sound quality is defined by bit rates in a range of 456 kbps and above, bit width greater than 24 bits, sample rate greater than 88.20 kHz, and six audio channels.

52. The audio fidelity meter of claim 38, wherein said low, medium, and high levels of sound quality are visually represented by red, yellow, and green colors, respectively.

53. The audio fidelity meter of claim 38, wherein said HD audio and HD surround levels of sound quality are visually represented by purple color.

54. The audio fidelity meter of claim 38, wherein said HD surround level of sound quality is reproduced in a plurality of channels.

55. The audio fidelity meter of claim 37, wherein said levels of sound quality include low, medium, high, HR (High Resolution) audio, and HD surround.

56. The audio fidelity meter of claim 36, wherein the bit rate is one of a plurality of digital audio quality descriptors, said plurality of digital audio quality descriptors further including format, source, bit width, and sample rate.

57. The audio fidelity meter of claim 56, wherein said fidelity meter scale is adapted to visually represent the sound quality of an encoded digital audio file based on its extracted bit rate and at least one of the remaining digital audio quality descriptors, wherein the remaining digital audio quality descriptors include format, source, bit width, and sample rate.

58. The audio fidelity meter of claim 36, wherein said fidelity meter indicator is adapted to return to a pre-determined base position when digital audio file playback ends.

59. The audio fidelity meter of claim 36, wherein said fidelity meter indicator is adapted to oscillate in synchronization with the sound of the digital audio file.

60. The audio fidelity meter of claim 59, wherein said synchronized indicator oscillation is achieved by reading the waveform data of the digital audio file at timed intervals during playback.

61. The audio fidelity meter of claim 36, wherein said fidelity meter bit rate display is dynamically updated during playback of a VBR (Variable Bit Rate) encoded digital audio file.

62. The audio fidelity meter of claim 36, wherein said fidelity meter bit rate display shows one bit rate during the entire playback of a CBR (Constant Bit Rate) encoded digital audio file.

63. The audio fidelity meter of claim 36, wherein said fidelity meter bit rate display shows a constant value representing the average bit rate of a VBR (Variable Bit Rate) encoded digital audio file.

64. The audio fidelity meter of claim 36, wherein said fidelity meter bit rate display shows a constant value representing the mean bit rate of a VBR (Variable Bit Rate) encoded digital audio file.

65. The audio fidelity meter of claim 36, wherein said fidelity meter bit rate display shows a constant value representing the median bit rate of a VBR (Variable Bit Rate) encoded digital audio file.

* * * * *